United States Patent
Hemphill et al.

(10) Patent No.: US 10,872,731 B2
(45) Date of Patent: Dec. 22, 2020

(54) ALUMINUM OXIDE LAYER ON ANODE FOIL FOR ALUMINUM ELECTROLYTIC CAPACITOR

(71) Applicant: Pacesetter, Inc., Santa Clara, CA (US)

(72) Inventors: Ralph Jason Hemphill, Sunset, SC (US); James Brian Smith, Pickens, SC (US)

(73) Assignee: Pacesetter, Inc., Santa Clara, CA (US)

( * ) Notice: Subject to any disclaimer, the term of this patent is extended or adjusted under 35 U.S.C. 154(b) by 0 days.

(21) Appl. No.: 16/888,647

(22) Filed: May 29, 2020

(65) Prior Publication Data

US 2020/0294723 A1    Sep. 17, 2020

Related U.S. Application Data

(63) Continuation of application No. 15/996,219, filed on Jun. 1, 2018, now Pat. No. 10,707,024.

(51) Int. Cl.
| | |
|---|---|
| *H01G 9/00* | (2006.01) |
| *H01G 9/045* | (2006.01) |
| *H01G 9/048* | (2006.01) |
| *C25D 11/12* | (2006.01) |
| *H01G 9/02* | (2006.01) |

(52) U.S. Cl.
CPC ........... *H01G 9/0032* (2013.01); *C25D 11/12* (2013.01); *H01G 9/045* (2013.01); *H01G 9/048* (2013.01); *H01G 9/02* (2013.01)

(58) Field of Classification Search
CPC ...... H01G 9/0032; H01G 9/045; H01G 9/048; H01G 9/02; H01G 9/012
See application file for complete search history.

(56) References Cited

U.S. PATENT DOCUMENTS

| | | | |
|---|---|---|---|
| 5,131,388 A | 7/1992 | Pless et al. | |
| 7,175,676 B1 | 2/2007 | Stevens et al. | |
| 7,695,529 B1 | 4/2010 | Marshall et al. | |
| 9,548,166 B2 | 1/2017 | Viste et al. | |
| 9,842,702 B1 | 12/2017 | Bowen et al. | |
| 10,707,024 B2 * | 7/2020 | Hemphill | H01G 9/0032 |
| 2017/0200560 A1 | 7/2017 | Bowen et al. | |

* cited by examiner

*Primary Examiner* — Seahvosh Nikmanesh (57) ABSTRACT

A method of producing an oxide layer on a foil for use in a capacitor includes immersing the foil in a first solution; maintaining a target current between the immersed anodic foil and the first solution until a first target voltage is reached to form an oxide layer overlying the foil; maintaining the target current between the immersed foil and the first solution until a second target voltage is reached to reform the oxide layer; removing the foil from the first solution and heating the foil; immersing the heat treated foil in a second solution; maintaining the target current between the immersed foil and the second solution until a third target voltage is reached; and discharging the immersed foil after each of the first, second, and third target voltages are reached.

19 Claims, 6 Drawing Sheets

ALUMINUM OXIDE LAYER ON ANODE FOIL FOR ALUMINUM ELECTROLYTIC CAPACITOR

RELATED APPLICATIONS

This Patent Application is a continuation of U.S. patent application Ser. No. 15/996,219, filed on Jun. 1, 2018, entitled "Method of Forming an Aluminum Oxide Layer on Anode Foil for Aluminum Electrolytic Capacitor," and incorporated herein in its entirety.

FIELD OF THE INVENTION

The present disclosure relates generally to the field of electrolytic capacitors and batteries.

BACKGROUND

Compact, high voltage capacitors are utilized as energy storage reservoirs in many applications, including implantable medical devices. These capacitors are required to have a high energy density, since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable cardioverter defibrillators, such as those disclosed in U.S. Pat. No. 5,131,388, the disclosure of which is hereby incorporated herein by reference, typically use two electrolytic capacitors in series to achieve the desired high voltage for shock delivery. For example, an ICD may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors include an etched aluminum foil anode, an aluminum foil or film cathode, and a kraft paper or fabric gauze separator impregnated with a solvent-based liquid electrolyte interposed between the anode and the cathode. While aluminum is the preferred metal for the anode plates, other metals such as tantalum, magnesium, titanium, niobium, zirconium and zinc may be used. A typical solvent-based liquid electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered stack structure of electrode materials with separators interposed therebetween, such as those disclosed in the above-mentioned U.S. Pat. No. 5,131,388.

In ICDs, as in other applications where space is a critical design element, it is desirable to use capacitors with the greatest possible capacitance per unit volume. Since the capacitance of an aluminum electrolytic capacitor is provided by the anodes, a clear strategy for increasing the energy density in the capacitor is to minimize the volume taken up by the separators and cathodes and maximize the number of anodes. A multiple anode stack configuration requires fewer cathodes and paper separators than a single anode configuration and thus reduces the size of the device. A multiple anode stack consists of a number of units each consisting of, in series, a cathode, a paper separator, two or more anodes, a paper separator and a cathode, with neighboring units sharing the cathode between them, all placed within the capacitor case.

The energy density of aluminum electrolytic capacitors is directly related to the surface area of the anodes generated in the electrochemical etching processes. Typical surface area increases are 40 to 1 and represent 30 to 40 million tunnels/cm$^2$. An electrochemical widening step is used to increase the tunnel diameter after etching to insure the oxide layer described below will not close off the tunnels.

The high surface area foil is put through an oxidation process to grow a voltage supporting oxide layer with low leakage current and low deformation properties. An oven depolarization process is used after the oxidation process to drive off the waters of hydration, induce stress cracking and expose weak areas. A subsequent oxidation process, i.e., a reformation process, "heals" the stress cracks and improves the resulting leakage current. The number of defects can be reduced with each subsequent reformation and depolarization process until a constant level of defects is achieved.

However, the inventors have discovered that the use of several depolarization steps has a negative effect on capacitance and deformation in an electrolytic capacitor. Accordingly, there is a need in the art for improved oxide formation processes.

BRIEF SUMMARY

Metal foils having oxide layers, devices using the same, and methods of making the same are disclosed herein.

One aspect of the present disclosure relates to a method of producing an oxide layer on an anodic foil for use in a capacitor. The method includes immersing an anodic foil in a first solution; maintaining a target current between the immersed anodic foil and the first solution until a first target voltage is reached to form an oxide layer overlying the anodic foil; discharging the immersed anodic foil after the first target voltage is reached; maintaining the target current between the immersed anodic foil and the first solution until a second target voltage is reached to reform the oxide layer a first time; discharging the immersed anodic foil after the second target voltage is reached; removing the anodic foil from the first solution and heating the anodic foil at a temperature sufficient to induce defects in the reformed oxide layer; immersing the heat treated anodic foil in a second solution; maintaining the target current between the immersed anodic foil and the second solution until a third target voltage is reached to reform the oxide layer a second time; and discharging the immersed anodic foil after the third target voltage is reached.

Another aspect of the present disclosure relates to a device. The device includes a conductive anode; a layer of a barrier oxide disposed on a surface of the conductive anode, wherein the barrier oxide is an aluminum oxide having a boehmite phase and a pseudo-boehmite phase, the amount of the boehmite phase being greater than the amount of the pseudo-boehmite phase; a conductive cathode; a separator disposed between the anode and the cathode; and an electrolyte disposed between the anode and the cathode.

DETAILED DESCRIPTION

The following detailed description of methods of forming an oxide layer and capacitor designs refers to the accompanying drawings that illustrate exemplary embodiments consistent with these devices. Other embodiments are possible, and modifications may be made to the embodiments within the spirit and scope of the methods and systems presented herein. It will be apparent to a person skilled in the relevant art that the methods and systems can also be employed to produce porous anode foils for use in a variety of devices and applications in addition to their use in implantable cardioverter defibrillators (ICD). Therefore, the following detailed description is not meant to limit the devices described herein. Rather, the scope of these methods and devices is defined by the appended claims.

Figure 1:
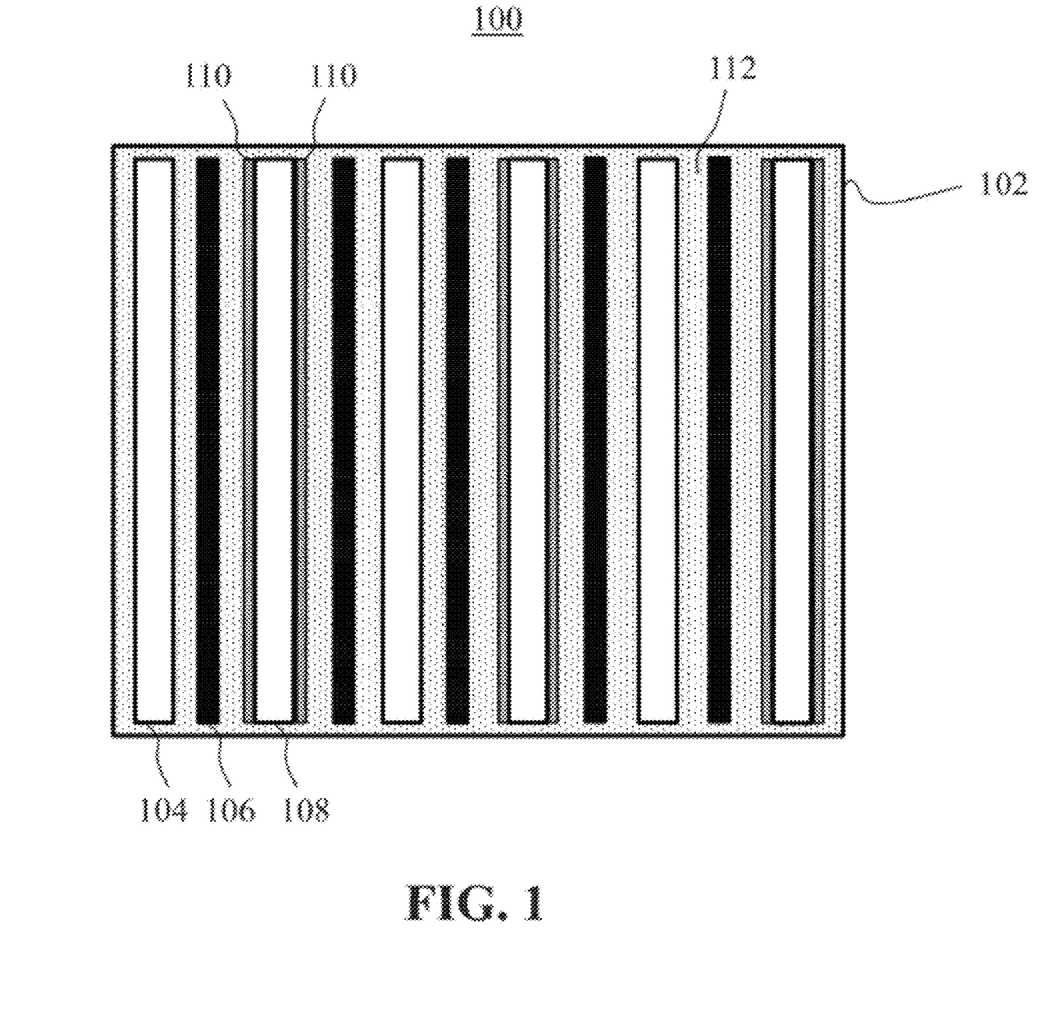
FIG. 1 is a cross-sectional view of an electronic component in accordance with an embodiment of the present disclosure.

FIG. 1 is a cross-sectional view of an electronic component 100. Electronic component 100 includes a housing 102 that contains a plurality of cathodes 104 alternating with a plurality of anodes 108, with each cathode being separated from an adjacent anode by a separator 106. Each anode 108 includes a dielectric material 110, e.g., an oxide layer, on or around its outer surface. Dielectric material 110 may be an oxide that is thermally grown on, or deposited onto, the surface of anode 108. A high-k dielectric material may be used for dielectric material 110. A conductive electrolyte 112 fills the space between each of the elements within housing 102. Electrolyte 112 may be a polymer or liquid electrolyte as would be understood by one skilled in the art. Example electrolytes include ethylene glycol/boric acid-based electrolytes and anhydrous electrolytes based on organic solvents such as dimethylformamide (DMF), dimethylacetamide (DMA), or gamma-butyrolactone (GBL). The plurality of cathodes 104 may be electrically connected to a single, common cathode terminal, and the plurality of anodes 108 may be similarly connected to a single, common anode terminal.

Electronic component 100 may be, for example, an electrolytic capacitor or a battery. When electronic component 100 is used as a capacitor, example materials for the plurality of cathodes 104 include aluminum, titanium and stainless steel, while example materials for the plurality of anodes 108 include aluminum and tantalum. When electronic component 100 is used as a battery, example materials for the plurality of cathodes 104 include silver vanadium oxide, carbon fluoride, magnesium oxide, or any combination thereof, while example materials for the plurality of anodes 108 include lithium metal.

Separators 106 may be provided to maintain a given separation between each cathode 104 and an adjacent anode 108 within housing 102. Additionally, separators 106 may be provided to prevent arcing between cathode 104 and anode 108 in spaces where dielectric 110 may be very thin or nonexistent, and/or where a void within electrolyte 112 exists between cathode 104 and anode 108.

The dielectric layer 110, e.g., an oxide layer, provides a high resistance to current passing between the electrolyte and the anode 108 in the capacitor. This current is referred to as the leakage current. A high leakage current can result in poor performance and reliability of an electrolytic capacitor. In particular, high leakage current results in a greater amount of charge leaking out of the capacitor once it has been charged.

Figure 2:
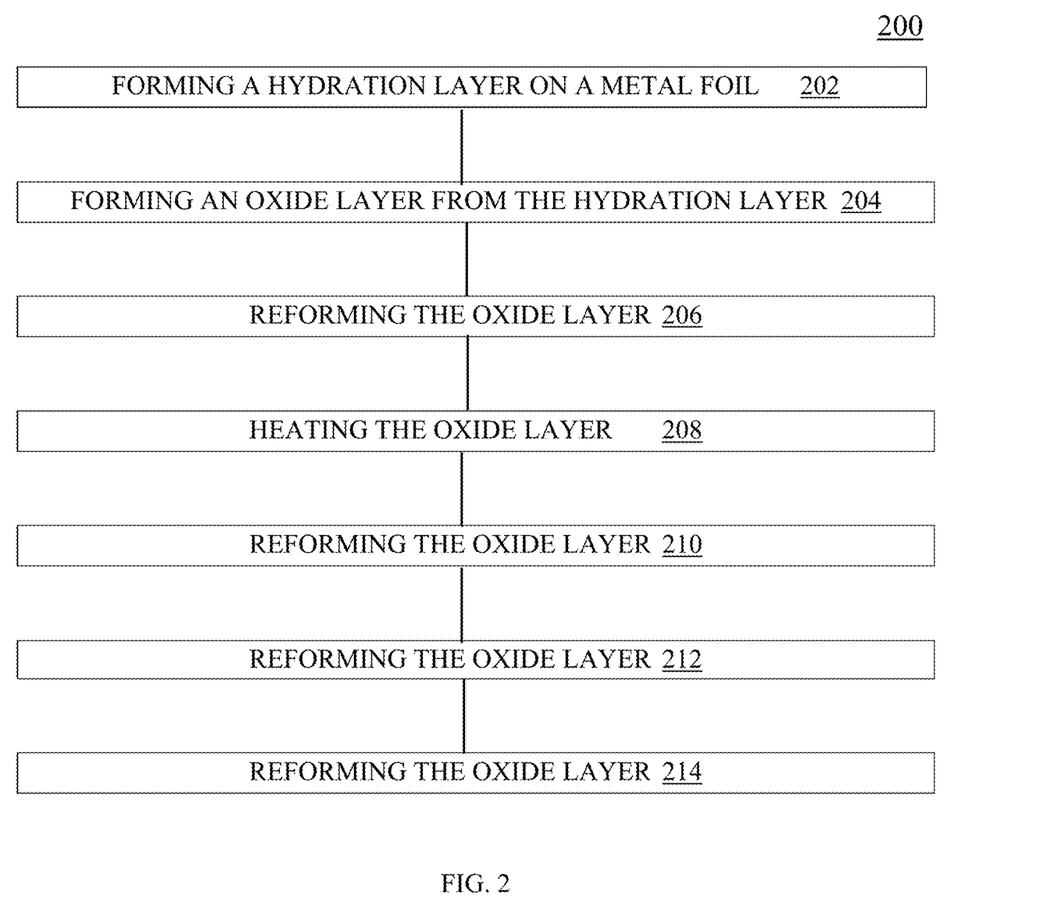
FIG. 2 depicts a method for producing an oxide layer in accordance with an embodiment of the present disclosure.

In an embodiment, the dielectric layer 110 includes aluminum oxide, where the aluminum oxide includes a pseudo-boehmite phase and a boehmite phase. As discussed in method 200 below, method steps are performed to maximize the presence of the boehmite phase in the aluminum oxide. The increased presence of the boehmite phase can result in less deformation of the capacitor and a reduced maintenance cycle.

The amount of the boehmite phase in the aluminum oxide layer may be about 50 weight percent (wt %) or greater. In one embodiment, the amount of boehmite phase may range from about 50 wt % to about 51 wt % of the aluminum oxide. The amount of the pseudo-boehmite phase may be about 50 wt % or less of the aluminum oxide. In one embodiment, the amount of pseudo-boehmite phase may range from about 49 wt % to about 50 wt %. The boehmite phase is less porous than the pseudo-boehmite phase, and may provide increased protection against the aqueous solvent of the electrolyte which can cause deformation of the capacitor. The pseudo-boehmite phase may be characterized by a higher water content than the boehmite phase. While not wanting to be bound by any particular theory, the inventors believe that the structure of an aluminum oxide layer having a pseudo-boehmite phase may be a core-shell structure in which the boehmite phase is present at the surface and the pseudo-boehmite phase is deeper in the aluminum oxide.

It should be understood that the various elements and dimensions of electronic component 100 are not drawn to scale. Although each cathode 104, separator 106, and anode 108 are illustrated as being spaced apart from one another for the convenience of illustration and labeling, it would be understood by one skilled in the art that such elements may also be stacked together in close physical contact with one another.

FIG. 2 provides an exemplary method 200 of producing an oxidation layer on an anode foil for use in a capacitor. Method 200 begins with a metal foil having tunnels or pores etched therein. In one embodiment, the metal foil is an aluminum foil, and the oxidation layer formed thereon is an aluminum oxide ($Al_2O_3$) layer. After the tunnels or pores are formed by an etching process, the tunnels can be widened to further increase the surface area of the etched metal foil. Examples of the etching and widening processes may be found in U.S. Pat. Nos. 6,858,126, 6,802,954, and 8,535,507, the disclosures of which are incorporated herein by reference. Etching and widening processes that produce tunnels or pores in a metal foil are not required for using the metal foil as an anode within a capacitor. However, the presence of tunnels or pores in the metal foil drastically increases the surface area of the anode and therefore the capacity and charge density of the capacitor. The etched metal foil may be anodized prior to formation of the oxide layer, for example, by methods described in U.S. Pat. No. 7,175,676, the disclosure of which is incorporated herein by reference.

The method 200 may have advantages over a conventional method which uses a foil roll, where, for example, a leading section of the foil roll having an oxide layer is heated in an oven, while a lagging section of the foil roll undergoes an oxide formation process. The method 200 may use individual foil sheets instead of a foil roll. Among the advantages of individual foil sheets as compared to a foil roll is that each individual foil can be bled down to a desired leakage current, whereas in a foil roll the leakage current is estimated based on the time a portion of the foil roll spends in a solution to grow or reform an oxide layer. Because a process using an individual foil sheet can be more tightly controlled, variability in leakage current, capacitance, and deformation of the capacitor can be reduced.

At step 202, a hydration layer is formed over the exposed metal on the etched metal foil. The etched metal foil may be placed into a bath containing water. In one example, the water is de-ionized. The bath of water may be held at a temperature of between about 60° C. and about 100° C., and preferably at about 95° C. The etched metal foil may remain within the bath for between about 2 minutes and about 20 minutes to form the hydration layer. In an embodiment, the bath of water may be sonicated at either sonic or ultrasonic frequencies.

At step 204, an oxide layer is formed on the exposed metal surfaces of the etched metal foil. The oxide layer is formed on one or both surfaces of the metal foil by placing the foil into a first solution and applying a voltage between the metal foil and the first solution.

The composition of the first solution includes an ionogen. Exemplary ionogens can include dimethyl amine sebacate (DMAS) and citric acid. The ionogens may be present in the first solution in amounts between about 0.1 wt % and about 2 wt % based on the total weight of the first solution, where the total weight includes a solvent, the ionogen, and any other additives. In one embodiment, the amount of ionogen in the first solution may be about 0.5 wt %. In one embodiment, the first solution includes 0.5 wt % citric acid as an ionogen agent in an aqueous solvent. The first solution may also include a phosphate. The phosphate can aide in the creation of a boehmite phase in the oxide layer without damaging the leakage current of the oxide layer. When present in the first solution, the phosphate may constitute between about 5 ppm and about 20 ppm of the solution. Exemplary phosphates may include any phosphate salt. The first solution may be maintained at a temperature ranging from about 80° C. to about 100° C. during step 204. In one embodiment, the temperature of the first solution is maintained at about 85° C.

In operation, a device, such as a power supply that can be set to maintain a constant current and/or a constant voltage, is used to raise an applied voltage until the current between the metal foil and the first solution reaches a target current. The target current ranges from about 2000 mA to about 5000 mA. When normalized to the surface area of the foil, the target current ranges from about 7.4 milliAmps per square centimeter ($mA/cm^2$) to about 18.5 $mA/cm^2$. As the oxide layer grows and/or reforms, the resistance within the circuit increases. Accordingly, to maintain the target current, the applied voltage is adjusted until a first target voltage is reached. The first target voltage may be between about 430V and about 510V. Once the first target voltage is reached, the first target voltage is maintained and the current is allowed to drop as the oxide layer continues to grow and/or reform and the resistance continues to increase. When the current drops to a desired level, step 204 can be terminated. The desired level, i.e., the desired leakage current, can be between about 0.1 $mA/cm^2$ and about 2.0 $mA/cm^2$. In one embodiment, the desired leakage current is about 1.1 $mA/cm^2$. In some embodiments, the formation process at step 204 can continue for up to about 3 hours before reaching the desired leakage current.

As the desired leakage current is reached, the voltage may be dropped, for example, to about 50 V. The current may continue to drop as the voltage is lowered until the foil is discharged to 0 V.

The thickness of the oxide layer formed on the metal foil is proportional to the first target voltage. In some embodiments, a layer thickness of between about 10 Angstroms and about 15 Angstroms per applied volt may be achieved.

At step 206, a first reformation process is performed. The first reformation process may occur about 5 to 20 minutes after step 204 is completed. In some embodiments, the first reformation process occurs about 5 minutes after completion of the formation process at step 204. The first reformation process reforms the oxide layer on the metal foil. In one embodiment, the first reformation process is performed in the first solution without having removed the metal foil after step 204.

For steps that use the same solution, such as the formation process at step 204 and the first reformation process at step 206, the first solution may be monitored and may be recharged if it becomes necessary. For example, the first solution can be monitored for conductivity. If the conductivity drops below about 500 microsiemens (μS), ionogen can be added to the solution to increase the conductivity.

The first reformation process is similar in operation to the formation process at step 204, except that the target voltage, a second target voltage, is lower than the first target voltage. In one embodiment, the difference between the first target voltage at step 204, and the second target voltage at step 206, is about 5 volts. In some embodiments, the difference in the first and second target voltages may range from about 0 V to about 10 V. The second target voltage may be between about 420 V and about 505 V. As with the formation process at step 204, the target current may be maintained until the second target voltage is reached between the metal foil and the first solution. The second target voltage is then maintained while the current is allowed to decrease. As the resistance increases due to reformation of the oxide layer, the current drops until the desired leakage current is reached. The desired level of the leakage current may be between about 0.1 $mA/cm^2$ and about 2.0 $mA/cm^2$. In one embodiment, the desired level of leakage current is about 0.74 $mA/cm^2$. In some embodiments, the first reformation process may continue for up to about 1 hour before the desired leakage current is reached. The foil can then be discharged to 0 V in the same manner as discussed above for step 204.

At step 208, the metal foil having the reformed oxide layer thereon is removed from the first solution and heated to expose weaknesses and/or defects in the reformed oxide layer. The temperature of the heating step may be sufficient to induce defects in the reformed oxide layer. In some embodiments, the foil may be heated to a temperature of between about 350° C. and about 650° C. In an embodiment, the foil may be heated to a temperature of about 500° C. The heating may be performed under atmospheric pressure conditions in an oven or furnace for up to about 5 minutes. In some embodiments, the heating may be performed for a time period of between about 30 seconds and about 6 minutes. In one embodiment, the heating is performed for about 5 minutes at about 500° C.

The heating at step 208 may be the only heating step performed during the entire process. Optionally, as discussed below, if a desired leakage current is not achieved after a third reformation step, then a second heating step may be performed.

At step 210, after the oxide layer has been subjected to the heating step, a second reformation process is performed by placing the metal foil into a second solution. The composition of the second solution may be similar or equivalent to that of the first solution. It is possible to switch ionogens between the first and second solutions, if desired. The second reformation process is similar in operation to the first reformation process at step 206, except that the target voltage, a third target voltage, may be lower than the second target voltage. In some embodiments, the difference between the second target voltage and the third target voltage may range from about 0 V to about 10 V. In one embodiment, the third target voltage is lower than the second applied voltage by about 5 Volts. The third target voltage may be between about 420 V and about 505 V. In the second reformation process, the target current may be maintained until the third target voltage is reached. The third target voltage is then maintained while the current decreases. As the resistance increases due to reformation of the oxide layer, the current drops until the desired leakage current is reached. The desired level of the leakage current may be between about 0.1 mA/cm$^2$ and about 2.0 mA/cm$^2$. In one embodiment, the desired level of leakage current is about 0.56 mA/cm$^2$. In some embodiments, the second reformation process may continue for up to about 40 minutes before the desired leakage current is reached. The foil can then be discharged to 0 V in the same manner as discussed above for step 204.

At step 212, a third reformation process is performed. In one embodiment, the third reformation process is performed in the second solution without having removed the metal foil after step 210. The third reformation process is similar in operation to the second reformation process at step 210. In one embodiment, the third reformation process is performed under the same conditions, i.e., the same target voltage and target current, as the second reformation process. In some embodiments, the target voltage at step 212, the fourth target voltage, may be between about 420 V and about 505 V. In the third reformation, the target current is maintained until the fourth target voltage is reached. The fourth target voltage is then maintained while the current decreases. As the resistance increases due to reformation of the oxide layer, the current drops until the desired leakage current is reached. The desired level of the leakage current may be between about 0.1 mA/cm$^2$ and about 2.0 mA/cm$^2$. In one embodiment, the desired level of leakage current is about 0.44 mA/cm$^2$. In some embodiments, the third reformation process may continue for up to about 20 minutes before the desired leakage current is reached. The foil can then be discharged to 0 V in the same manner as discussed above for step 204.

If the desired leakage current is not reached during the third reformation process at step 212, the metal foil having the reformed oxide layer thereon optionally may be removed from the second solution and heated. The temperature of the heating step may be sufficient to induce defects in the reformed oxide layer. In some embodiments, the foil may be heated to a temperature of between about 200° C. and about 400° C. In an embodiment, the foil may be heated to a temperature of about 300° C. The heating may be performed under atmospheric pressure conditions in an oven or furnace for up to about 5 minutes. In some embodiments, the heating may be performed for a time period of between about 30 seconds and about 6 minutes. In one embodiment, the heating is performed for about 5 minutes at about 300° C. After this optional step, the method proceeds to step 214.

At step 214, a fourth reformation process is performed. In one embodiment, the fourth reformation process is also performed in the second solution without having removed the metal foil after step 212. The fourth reformation process is similar in operation to the third reformation process at step 212. In one embodiment, the fourth reformation process is performed under the same conditions, i.e., the same target voltage and target current, as the second and third reformation processes. In some embodiments, the target voltage at step 214, the fifth target voltage, may be between about 420 V and about 505 V. In the fourth reformation process, the target current is maintained until the fifth target voltage is reached. The fifth target voltage is then maintained while the current decreases. As the resistance increases due to reformation of the oxide layer, the current drops until the desired leakage current is reached. The desired level of the leakage current may be between about 0.1 mA/cm$^2$ and about 2.0 mA/cm$^2$. In one embodiment, the desired level of leakage current is about 0.41 mA/cm$^2$. In some embodiments, the fourth reformation process may continue for up to about 20 minutes before the desired leakage current is reached. The foil can then be discharged to 0 V in the same manner as discussed above for step 204.

In an embodiment, the reformation processes at steps 206, 210, 212, and 214 may be performed under the same conditions, i.e., the same target voltage and same target current. In other embodiments, the target voltage can be stepped down between the first reformation process at step 206 and the fourth reformation process at step 214. In one embodiment, the step down can be a linear step down, for example, from 500 V, to 490 V, to 480 V, to 470 V for steps 206, 210, 212, and 214, respectively. In other embodiments, the step down can be non-linear for steps 206, 210, 212, and 214, respectively.

Though not wishing to be bound by any particular theory, it is believed that the optimization of the boehmite phase relative to the pseudo-boehmite phase decreases deformation in the capacitor and maintains a low leakage current. In the methods disclosed herein, these improvements are achieved by using a voltage derating of about 1.15 or higher. For example, for a capacitor that operates at 425 V, the formation and reformation processes may be performed at at least about 490 V, which results in a derating of 490 V/425 V, or 1.15. The methods disclosed herein allow for less oven treatments and maximize the boehmite phase while reducing the leakage current.

Once formation and reformation of the oxide layer is complete, additional method steps may be performed prior to assembling the anode foil having the oxide layer into a device. For example, the metal foil having the oxide layer thereon can be further processed to incorporate phosphate. This process can include dipping the metal foil having the oxide layer thereon into a phosphate-containing solution. The phosphate-containing solution may include about 1 wt % to about 5 wt % of a phosphate compound, based on 100 parts by weight of water. Exemplary phosphate compounds can include ammonium dihydrogen phosphate. In operation, the metal foil may be dipped in the phosphate-containing solution for about 1 to about 5 minutes and then removed from the solution and rinsed for about 1 to about 5 minutes.

Other method steps can include, in forming an anode suitable for use in a device, removing a section from the foil having the oxide layer formed thereon. The section may be, for example, mechanically cut, punched, or sheared from the foil, or cut using a laser. The section of foil may be sized to fit within the housing of a capacitor. The section of foil will have exposed metal along one or more edges that were previously attached to the larger foil.

A hydration layer can be formed over the exposed metal edges of the section of foil. To do so, the foil section may be placed into a bath containing water. In one example, the water is de-ionized. The bath of water may be held at a temperature of between about 60° C. and about 100° C., and preferably at about 95° C. The foil section may remain within the bath for between about 2 minutes and about 20 minutes to form the hydration layer. In an embodiment, the bath of water may be sonicated at either sonic or ultrasonic frequencies. The formation of the hydration layer will help to form a better quality oxide during the aging process, and also helps to reduce and/or smooth out the formation of burrs at the edges of the foil section.

The foil section, now having a hydration layer on its edges, is placed into a separate bath that includes ammonium dihydrogen phosphate to form a passivation layer over the foil edges. Note that this step is not required, but will increase the lifetime of the capacitor. In an embodiment, the ammonium dihydrogen phosphate bath is maintained at a temperature of between about 50° C. and about 90° C., and preferably at about 70° C. The bath contains between about 0.1 wt % and about 5.0 wt %, and preferably about 2.0 wt %, of ammonium dihydrogen phosphate. The foil section may be placed in the bath of ammonium dihydrogen phosphate for between about 1 and about 4 minutes. Afterwards, the foil section may be removed from the bath and rinsed under de-ionized water for between about 1 and about 12 minutes.

The foil section having the hydration layer can be assembled within a capacitor as the anode. Any number of such foil sections may be placed into the capacitor to form a single anode. An electrolyte is added to the capacitor. In one embodiment, the electrolyte may have a water content below about 3.0 wt %. In another embodiment, the electrolyte may have a water content between about 0.5 wt % and about 3.0 wt %. An electrolyte with a lower water content may be used in capacitors having anodes with a hydration layer when compared to conventional capacitor designs. Using an electrolyte with a water content between about 0.5 wt % and about 3.0 wt % may reduce the deformation of the capacitor by about 10% when compared to electrolytes with higher water contents.

Example 1

In Example 1, an anode having an oxide layer was prepared in accordance with embodiments of the present disclosure. The anode was assembled into an electrolytic capacitor and deformation was measured using an accelerated aging process.

An aluminum foil (270 $cm^2$ surface area as a plain sheet, etched tunnels to increase surface area about 40 times from plain sheet, 115 µm thickness) was placed in a water bath for 8 minutes at 95° C. to form a hydration layer. The aluminum foil was removed from the water bath and placed in a first aqueous solution having 0.5 wt % citric acid. An oxide layer was formed on the aluminum foil using a target current of 14.8 mA/$cm^2$ and a target voltage of 490 V. The formation process continued at the target current until the target voltage was reached, and then the target voltage was maintained and the current was allowed to drop. The current dropped until the leakage current reached 1.11 mA/$cm^2$. The time for forming the oxide layer was about 160 minutes. The foil was discharged to 0 V after the formation process. After formation, a first reformation of the oxide layer was performed in the first aqueous solution using a target voltage of 485 V and the same target current as in the formation process. The leakage current after the first reformation process reached 0.74 mA/$cm^2$. The time for the first reformation process to reach the desired leakage current was about 50 minutes. The foil was discharged to 0 V after the first reformation process.

After the first reformation process, the anode foil having the reformed oxide layer was removed from the first aqueous solution and heated in an oven (Linberg Blue M, available from Thermo Fisher Scientific, Inc.) at atmospheric pressure conditions for 5 minutes at 500° C.

The heated anode foil was removed from the oven and placed in a second aqueous solution having 0.5 wt % citric acid. A second reformation of the oxide layer was performed at a target voltage of 480 V and the same target current as the first reformation process. The leakage current after the second reformation process reached 0.56 mA/$cm^2$. The approximate time for the second reformation process to reach the desired leakage current was about 35 minutes. The foil was discharged to 0 V after the second reformation process.

Subsequently, a third reformation of the oxide layer was performed in the second aqueous solution at a target voltage of 480 V and the same target current as the second reformation process. The leakage current after the third reformation process reached 0.44 mA/$cm^2$. The approximate time for the third reformation process to reach the desired leakage current was about 10 minutes. The foil was discharged to 0 V after the third reformation process. Subsequently, a fourth reformation of the oxide layer was performed in the second aqueous solution at a target voltage of 480 V and the same target current as the third reformation process. The leakage current after the fourth reformation process reached 0.41 mA/$cm^2$. The approximate time for the fourth reformation process to reach the desired leakage current was about 10 minutes. The foil was discharged to 0 V after the fourth reformation process.

A discharge capacitance test was performed on the foil after the fourth reformation process whereby a voltage of about 50 V was applied between the immersed foil and the second aqueous solution, and a change in current was monitored over time. The capacitance of the foil was determined to be 1.22 µF/$cm^2$.

The foil was removed from the second solution and immersed in a phosphate solution for 2 minutes. The phosphate solution was an aqueous solution having 2 wt % ammonium dihydrogen phosphate. The foil was then removed from the phosphate solution and rinsed for 2 minutes with water.

A number of capacitors were manufactured using the anode having the oxide layer prepared above. Each capacitor had 29 anodes, 9 cathodes having Ti as the cathode material, and used ethylene glycol as the electrolyte.

Figure 3:
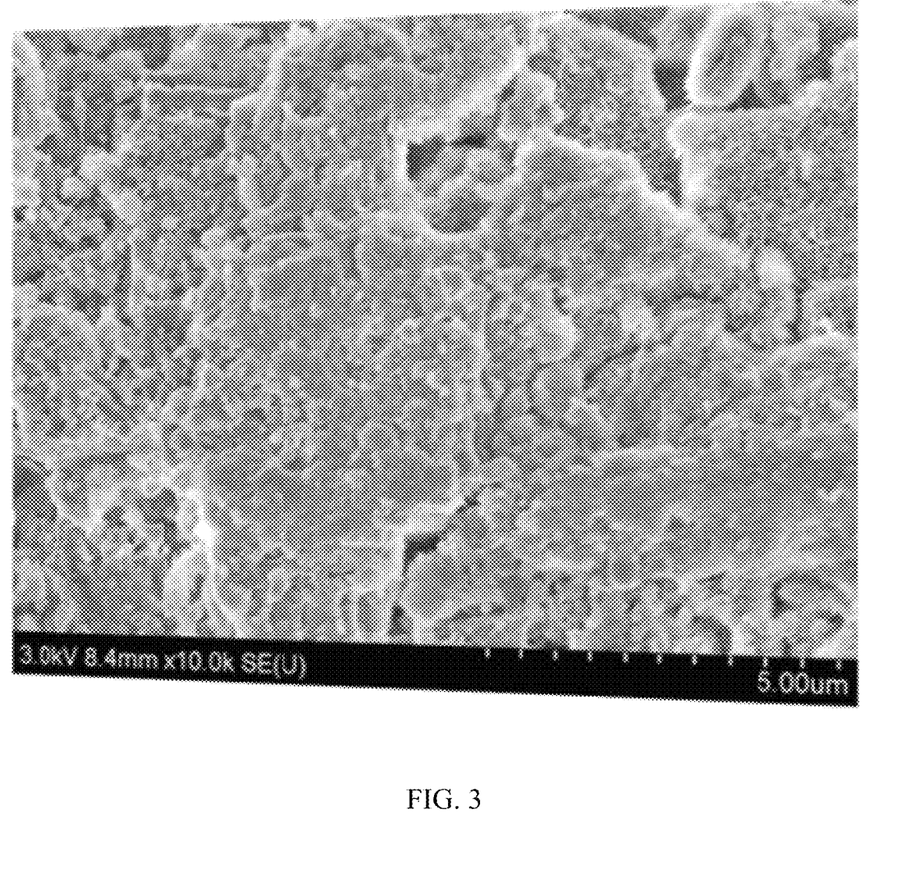
FIG. 3 is an SEM image of an aluminum oxide layer that has a predominant boehmite phase.
Figure 4:
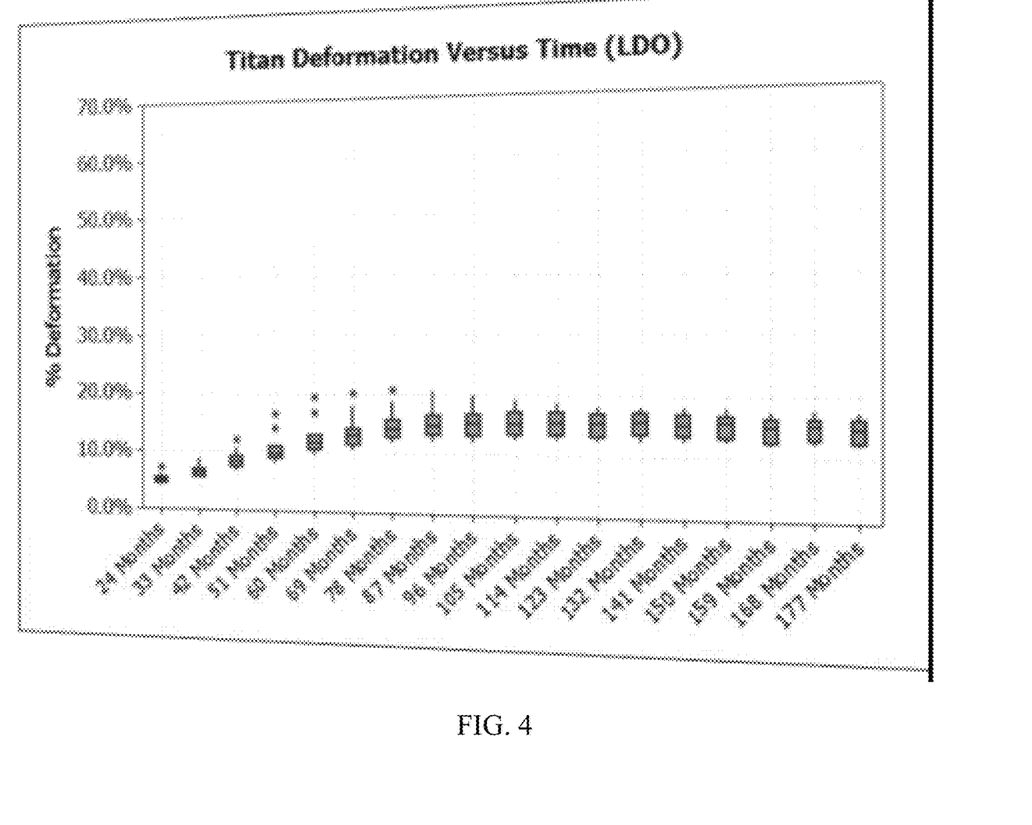
FIG. 4 is a graph depicting the deformation over time of a capacitor formed in accordance with an embodiment of the present disclosure.

FIG. 3 depicts an SEM image of the oxide layer which is predominantly a boehmite phase. In comparison to a pseudo-boehmite phase (shown in FIG. 5), the boehmite phase is more dense and less porous. FIG. 4 depicts the percent deformation of the capacitor under accelerated aging conditions. The percent deformation is equal to the time to charge the capacitor at the end of a measurement period ($t_i$) minus the time to charge the capacitor at time zero ($t_0$) divided by the charge time at $t_0$. For example, to measure the percent deformation after a period of 9 months, one measures the charge time at 0 months and the charge time at 9 months.

The percent deformation may be measured using an accelerated aging process. In such process, the capacitor is heated under atmospheric pressure for 50 hours at 90° C., which is equivalent to 9 months at 37° C. The other measurements scale proportionally. For example, the capacitor is heated for 132 hours at 90° C. for an equivalent aging of 24 months at 37° C. The data at each age in FIG. 4 is the result of about 20 to 30 capacitors being measured. As shown in FIG. 4, the method of Example 1 results in consistently reproducible results at each age.

Comparative Example 1

In Comparative Example 1, an anode having an oxide layer was prepared in accordance with a process that uses several heating steps. The anode was assembled into a electrolytic capacitor and deformation was measured using an accelerated aging process.

An aluminum foil having the same specifications as that of Example 1 was placed in a water bath for 8 minutes at 95° C. to form a hydration layer. The aluminum foil was removed from the water bath and placed in a first aqueous solution having 0.5 wt % citric acid. An oxide layer was formed on the aluminum foil using a target voltage of 490 V and a target current set point of 14.8 mA/cm$^2$. The formation process continued at the target current until the target voltage was reached, and then the target voltage was maintained and the current was allowed to drop. The current dropped until the leakage current reached 1.11 mA/cm$^2$. The time for forming the oxide layer was about 160 minutes. After the desired leakage current was reached, the voltage was lowered to about 50 V, and then the foil was discharged to 0 V before proceeding to the next step.

After the formation process, the anode foil having the reformed oxide layer was removed from the first aqueous solution and heated in a Linberg Blue M oven at atmospheric pressure conditions for 4 minutes at 500° C.

The heated anode foil was removed from the oven and placed in an aqueous solution having 0.5 wt % citric acid. This aqueous solution is the same as that used for the formation step. A first reformation of the oxide layer was performed using a target voltage of 485 V and the same target current as the formation process. The leakage current after the first reformation process reached 0.74 mA/cm$^2$. The time for the first reformation process to reach the desired leakage current was about 50 minutes. After the desired leakage current was reached, the foil was discharged to 0 V in the same manner as the formation step.

After the first reformation process, the anode foil having the reformed oxide layer was removed from the aqueous solution and heated in the oven at atmospheric pressure conditions for 4 minutes at 500° C.

The heated anode foil was removed from the oven and placed in an aqueous solution having 0.5 wt % citric acid. A second reformation of the oxide layer was performed using a target voltage of 480 V and the same target current as the first reformation process. The leakage current after the second reformation process reached 0.55 mA/cm$^2$. After the desired leakage current was reached, the foil was discharged to 0 V in the same manner as discussed for prior steps.

After the second reformation process, the anode foil having the reformed oxide layer was removed from the second aqueous solution and heated in the oven at atmospheric pressure conditions for 4 minutes at 500° C.

The heated anode foil was removed from the oven and placed in an aqueous solution having 0.5 wt % citric acid. A third reformation of the oxide layer was performed using a target voltage of 480 V and the same target current as the second reformation process. The leakage current after the third reformation process reached 0.55 mA/cm$^2$. After the desired leakage current was reached, the foil was discharged to 0 V in the same manner as discussed for prior steps.

After the third reformation process, the anode foil having the reformed oxide layer was removed from the aqueous solution and heated in the oven at atmospheric pressure conditions for 4 minutes at 500° C.

The heated anode foil was removed from the oven and placed in an aqueous solution having 0.5 wt % citric acid. A fourth reformation of the oxide layer was performed using a target voltage of 480 V and the same target current as the third reformation process. The leakage current after the fourth reformation process reached 0.55 mA/cm$^2$. After the desired leakage current was reached, the foil was discharged to 0 V in the same manner as discussed for prior steps.

A discharge capacitance test was performed on the foil after the fourth reformation process whereby a voltage of about 50 V was applied between the immersed foil and the second aqueous solution, and a change in current was monitored over time. The capacitance of the foil was determined to be 1.18 µF/cm$^2$. The capacitance of the foil in Comparative Example 1 is about 3% lower than the foil of Example 1.

The foil was removed from the second solution and immersed in a phosphate solution for 2 minutes. The phosphate solution was an aqueous solution having 2 wt % ammonium dihydrogen phosphate. The foil was then removed from the phosphate solution and rinsed for 2 minutes with water.

A number of capacitors were manufacturing using the foil having the oxide layer prepared by the methods of Comparative Example 1. Each capacitor was prepared in the same manner as Example 1.

Figure 5:
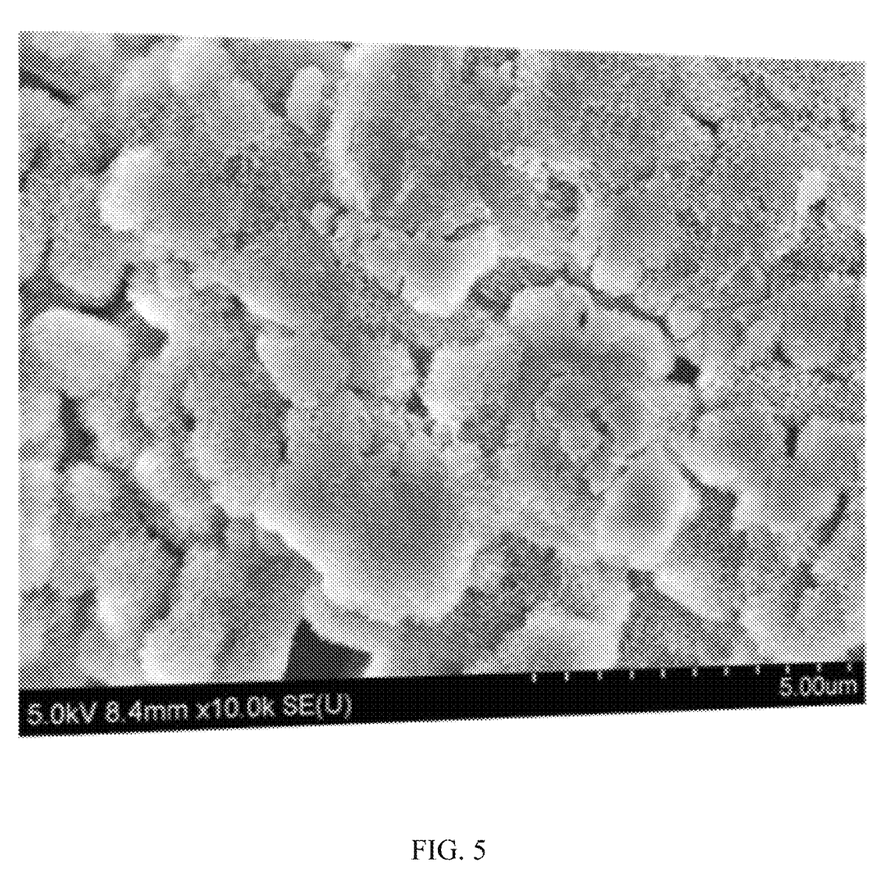
FIG. 5 is an SEM image of an aluminum oxide layer that has a predominant pseudo-boehmite phase.
Figure 6:
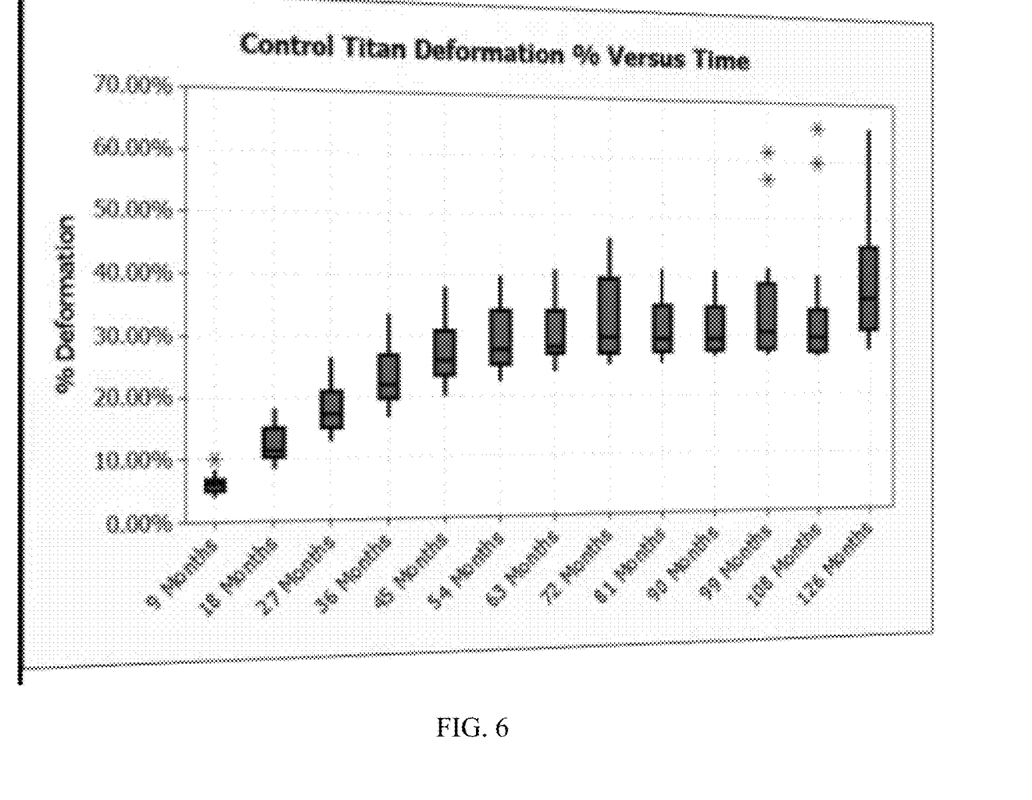
FIG. 6 is a graph depicting the deformation over time of a capacitor formed by a comparative method.

FIG. 5 depicts an SEM image of the oxide layer which is predominantly a pseudo-boehmite phase. FIG. 6 depicts the percent deformation of the capacitor under the same accelerated aging conditions used in Example 1. As shown in FIG. 6, the deformation of the capacitor in Comparative Example 1 is about 20% at 36 months, and reaches a deformation of about 30% or more at 72 months. In contrast, the deformation in the capacitor of Example 1 is lower. For instance, the deformation is about 10% or less for up to 51 months and remains at less than 20% after 177 months. The deformation in Example 1 is reduced about 65% in comparison to that in Comparative Example 1. Moreover, the variation in deformation is reduced using the method of Example 1 as well. Comparative Example 1, which shows a large variation at 9 months, is problematic because it is a period just prior to the maintenance cycle. The large variation indicates that capacitors formed by the method of Comparative Example 1 are not reliable in the period just prior to the maintenance cycle and could potentially fail if needed during this period. Reducing the deformation can result in increased ICD longevity due to less need for capacitor maintenance cycles. Accordingly, the time between each capacitor maintenance cycle can be increased. It is estimated that the capacitor of Example 1 will not require a maintenance cycle for at least 24 months, which exceeds the requirement of the capacitor of Comparative Example 1 by more than 1 year.

To summarize, the present disclosure describes a method of producing an oxide layer on an anodic foil for use in a capacitor. The method includes immersing an anodic foil in a first solution; maintaining a target current between the immersed anodic foil and the first solution until a first target voltage is reached to form an oxide layer overlying the anodic foil; discharging the immersed anodic foil after the first target voltage is reached; maintaining the target current between the immersed anodic foil and the first solution until a second target voltage is reached to reform the oxide layer a first time; discharging the immersed anodic foil after the second target voltage is reached; removing the anodic foil from the first solution and heating the anodic foil at a temperature sufficient to induce defects in the reformed oxide layer; immersing the heat treated anodic foil in a second solution; maintaining the target current between the immersed anodic foil and the second solution until a third target voltage is reached to reform the oxide layer a second time; and discharging the immersed anodic foil after the third target voltage is reached; and/or maintaining the target current between the immersed anodic foil and the second solution until a fourth target voltage is reached to reform the oxide layer a third time; and discharging the immersed anodic foil after the fourth target voltage is reached; and/or the fourth target voltage may be maintained until a desired leakage current between the immersed anodic foil and the second solution is achieved, and the method may include removing the anodic foil from the second solution and heating the anodic foil a second time at a temperature sufficient to induce defects in the reformed oxide layer when the desired leakage current is not achieved during maintenance of the fourth target voltage; and/or the step of heating the anodic foil a second time may be performed at a temperature of between about 200° C. and about 400° C. and for a time period of between about 30 seconds and about 6 minutes; and/or the method may further include maintaining a target current between the immersed anodic foil and the second solution until a fifth target voltage is reached to reform the oxide layer a fourth time; and discharging the immersed anodic foil after the fifth target voltage is reached; and/or the method may further include removing the anodic foil from the second solution; immersing the anodic foil in a phosphate-containing solution; removing the anodic foil from the phosphate-containing solution; and rinsing the anodic foil; and/or the first target voltage may be greater than the second target voltage, the second target voltage may be greater than the third target voltage, and the third, fourth and fifth target voltages may be equal; and/or a difference between the first target voltage and the second target voltage may be about 5 Volts (V), and a difference between the second target voltage and the third, fourth and fifth target voltages may be about 5 V; and/or the first target voltage may be maintained until a first desired leakage current is achieved;

and/or the second target voltage may be maintained until a second desired leakage current is achieved, and the third target voltage may be maintained until a third desired leakage current is achieved; and/or the first target voltage may be greater than the second target voltage, and the second target voltage may be greater than the third target voltage; and/or the method may further include hydrating the anodic foil to form a water hydration layer thereon prior to immersing the anodic foil in the first solution; and/or the first and second solutions may include an ionogen; and/or the first and second solutions may include a phosphate; and/or the heating step may be performed at a temperature of between about 350° C. and about 650° C. and for a time period of between about 30 seconds and about 6 minutes; and/or the anodic foil may include aluminum and the oxide layer may be an aluminum oxide;

and/or the oxide layer may include a boehmite phase and a pseudo-boehmite phase, and, after the oxide layer has been reformed the second time, the amount of the boehmite phase may be greater than the amount of the pseudo-boehmite phase.

Also described herein is a device including a conductive anode; a layer of a barrier oxide disposed on a surface of the conductive anode, wherein the barrier oxide is an aluminum oxide having a boehmite phase and a pseudo-boehmite phase, the amount of the boehmite phase being greater than the amount of the pseudo-boehmite phase; a conductive cathode; a separator disposed between the anode and the cathode; and an electrolyte disposed between the anode and the cathode; and/or the device may be an electrolytic capacitor.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A device, comprising:
a conductive anode;
a layer of a barrier oxide disposed on a surface of the conductive anode, wherein the barrier oxide is an aluminum oxide having a boehmite phase and a pseudo-boehmite phase, the amount of the boehmite phase being greater than the amount of the pseudo-boehmite phase;
a conductive cathode; and
a separator disposed between the anode and the cathode.

2. The device of claim 1, wherein the device is a capacitor.

3. The device of claim 2, wherein the device is an electrolytic capacitor.

4. The device of claim 1, wherein the boehmite phase is greater than or equal 50 wt % of the aluminum oxide.

5. The device of claim 4, wherein the boehmite phase is from 50 wt % to 51 wt % of the aluminum oxide.

6. The device of claim 5, wherein the pseudo-boehmite phase is from 49 wt % to 50 wt % of the aluminum oxide.

7. The device of claim 1, wherein the boehmite phase is less porous than the pseudo-boehmite phase.

8. The device of claim 1, wherein the pseudo-boehmite phase has a higher water content than the boehmite phase.

9. The device of claim 1, wherein the aluminum oxide includes cores in shells where the boehmite phase is present at a surface of the shells and the pseudo-boehmite phase is present in the cores.

10. The device of claim 1, wherein boehmite phase is less porous than the pseudo-boehmite phase;
the pseudo-boehmite phase has a higher water content than the boehmite phase; and
the aluminum oxide includes cores in shells where the boehmite phase is present at a surface of the shells and the pseudo-boehmite phase is present in the cores.

11. The device of claim 1, wherein tunnels extend into the anode at a density of 30 to 40 million tunnels/cm$^2$ of apparent area.

12. The device of claim 1, wherein the anode has a leakage current between 0.1 mA/cm$^2$ of apparent surface area and about 2.0 mA/cm$^2$ of apparent surface area.

13. The device of claim 1, wherein the anode includes a phosphate.

14. The device of claim 1, wherein the aluminum oxide is not positioned over an edge of the anode.

15. The device of claim 1, wherein a passivation layer is positioned on the anode.

16. The device of claim 15, wherein the aluminum oxide is not positioned over an edge of the anode and the passivation layer is positioned over the edge of the anode.

17. The device of claim 16, wherein an electrolyte between the anode and the cathode has a water content less than 3.0 wt % of the electrolyte.

18. The device of claim 17, wherein the electrolyte has a water content between 0.5 wt % and 3.0 wt %.

19. An electrolytic capacitor, comprising:
a conductive anode;
a layer of a barrier oxide disposed on a surface of the conductive anode, wherein the barrier oxide is an aluminum oxide having a boehmite phase and a pseudo-boehmite phase, the amount of the boehmite phase being greater than the amount of the pseudo-boehmite phase,
the boehmite phase being less porous than the pseudo-boehmite phase,
the pseudo-boehmite phase having a higher water content than the boehmite phase, and
the aluminum oxide includes cores in shells where the boehmite phase is present at a surface of the shells and the pseudo-boehmite phase is present in the cores;
a conductive cathode;
a separator disposed between the anode and the cathode; and
an electrolyte between the anode and the cathode with a water content less than 3.0 wt % of the electrolyte.

\* \* \* \* \*